Nov. 11, 1930.  V. R. STEWART  1,781,559
LOCOMOTIVE VALVE GEAR
Filed Nov. 30, 1926  3 Sheets-Sheet 1
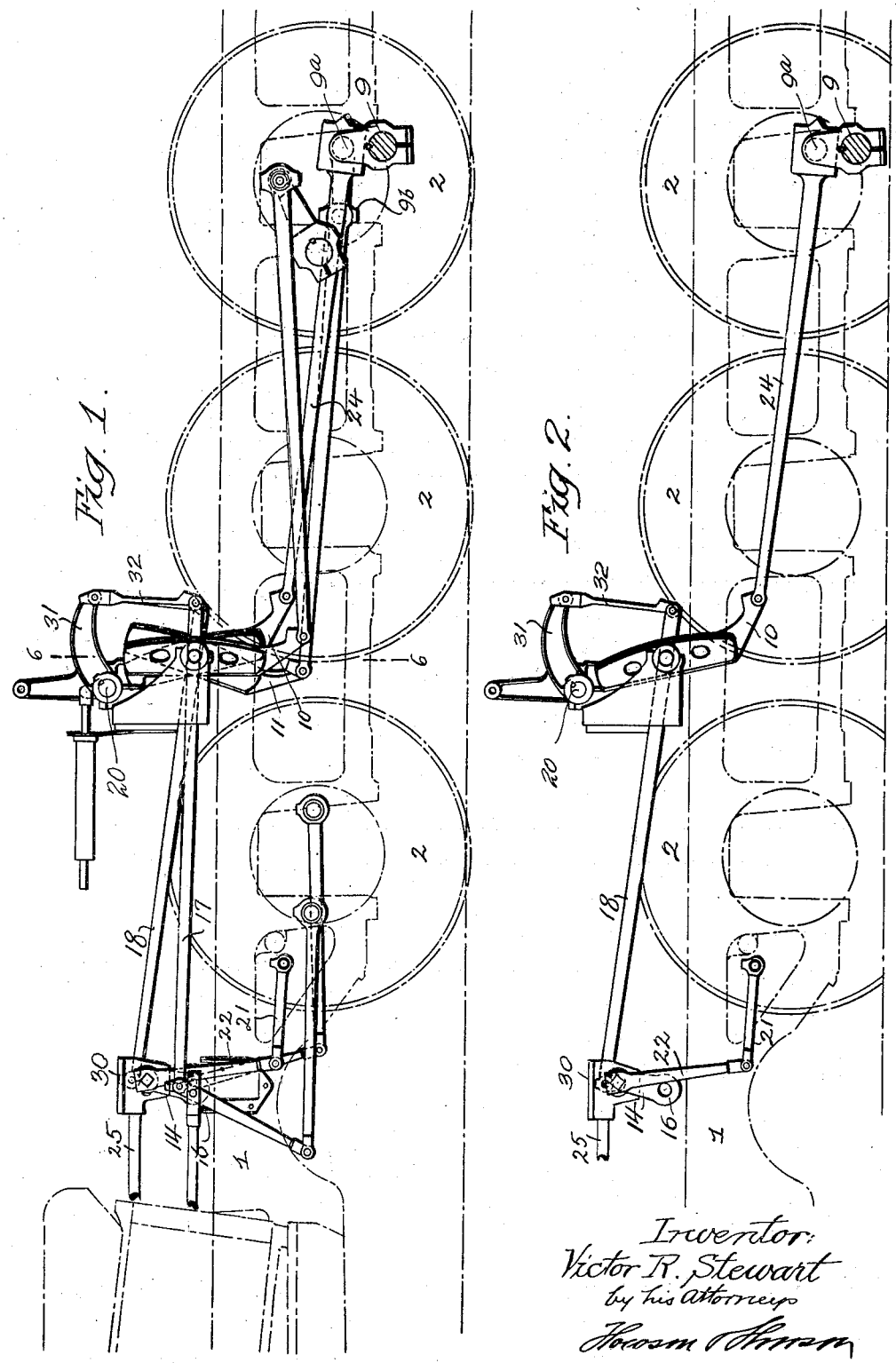
Inventor:
Victor R. Stewart
by his attorneys

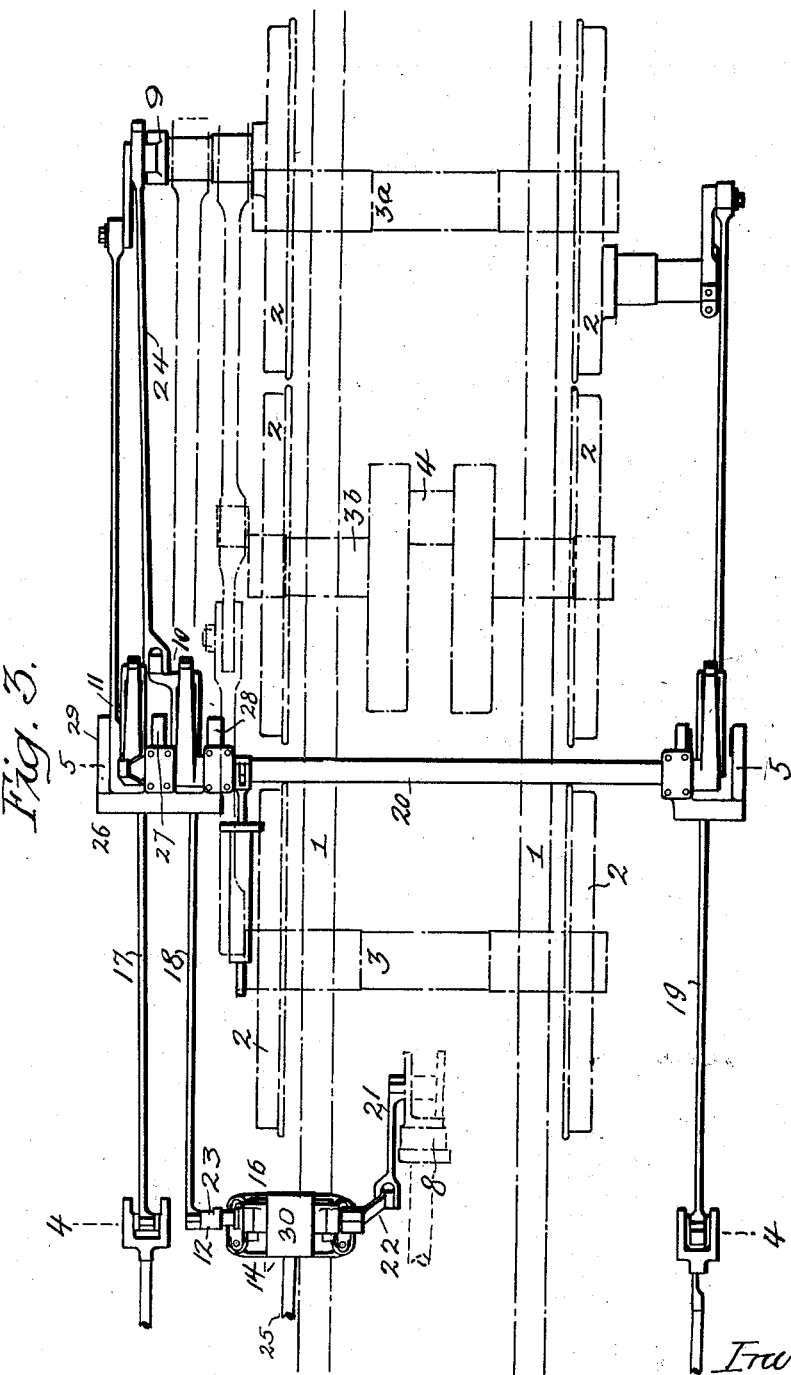

Nov. 11, 1930.   V. R. STEWART   1,781,559
LOCOMOTIVE VALVE GEAR
Filed Nov. 30, 1926   3 Sheets-Sheet 3
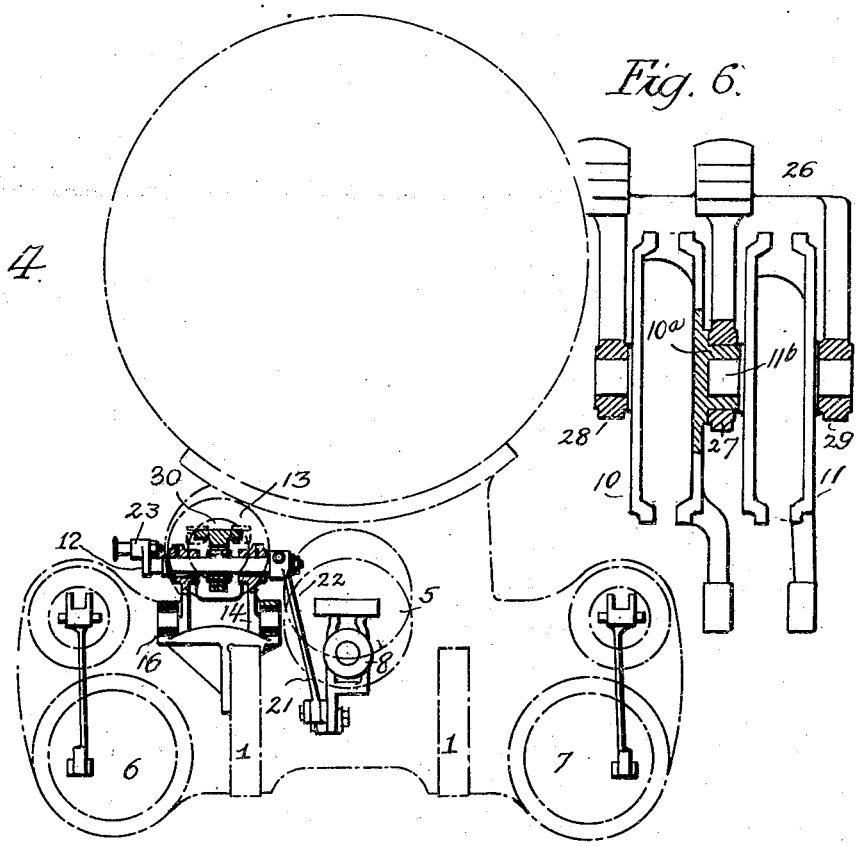
Fig. 6.
Fig. 4.
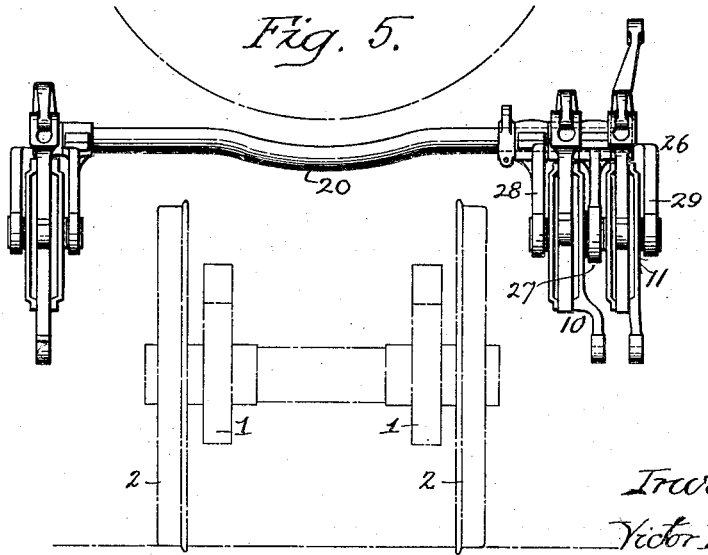
Fig. 5.
Inventor:
Victor R. Stewart
by his attorneys Patented Nov. 11, 1930

1,781,559

UNITED STATES PATENT OFFICE

VICTOR R. STEWART, OF GLENSIDE, PENNSYLVANIA

LOCOMOTIVE VALVE GEAR

Application filed November 30, 1926. Serial No. 151,732.

This invention relates to certain improvements in valve gears for three-cylinder locomotives, one object being to operate the valve of the middle cylinder by means of a valve gear which obtains its motion from the middle cross-head in combination with a crank on the outside of one of the driving wheels.

A further object of the invention is to align the three links which control the valve mechanism, two of said links being on one side of the locomotive and the other link on the opposite side thereof, and a single reversing shaft for shifting the rods actuated by the said links.

The invention also relates to other details which will be fully described hereinafter.

In the accompanying drawings:

Fig. 1 is a side view showing the engine frame in dotted lines and the valve mechanism on both sides of the locomotive in full lines;

Fig. 2 is a view similar to Fig. 1, showing a portion of the valve gear on one side of the locomotive only;

Fig. 3 is a plan view showing the frame and wheels in dotted lines;

Fig. 4 is a sectional view on the line 4—4, Fig. 3;

Fig. 5 is a sectional view on the line 5—5, Fig. 3; and

Fig. 6 is an enlarged sectional view on the lines 6—6, Fig. 1, illustrating the bearings for the links.

The frame 1 of the locomotive is shown by dotted lines, as well as the driving-wheels 2, which are mounted on axles 3, 3ª and 3ᵇ mounted in suitable boxes in the frame 1. The axle 3ᵇ is a crank-axle, having a crank-pin 4, to which is coupled the connecting rod of the central cylinder 5. The connecting rods of the outer cylinders 6 and 7 are coupled to one of the cranks of the driving-wheels in the ordinary manner.

The cross-head for the middle cylinder is indicated at 8, Figs. 3 and 4. The valve of the middle cylinder is operated without interfering with the valve gear of the two outside cylinders. This is accomplished by the combined movement of the crank 9 and cross-head 8. The crank 9 is a double crank on one of the wheels having pins 9ª and 9ᵇ. A rod 24 connects the pin 9ª on this crank 9 to a reversing link 10 which is located close to the reversing link 11. Directly back of the valve chest of the central cylinder in the present instance is a transverse rock-shaft 12. A rod 18 connects the link 10 to an arm 23 on the rock-shaft 12. The rock-shaft 12 is mounted in bearings in a rocker 14. The trunnions of this rocker are mounted in a bracket 16 secured to the frame or forming a part of the cylinder structure. Mounted on the rock-shaft is a head 30 to which is attached the valve-rod 25 of the valve of the central cylinder 5. On the rock-shaft 12 is an arm 22 which is connected by a link 21 to the cross-head.

The rock-shaft 12, being supported on the rocker 14, permits the free movement of the said shaft 12 on a line parallel to the center line of the locomotive, and as this shaft is connected to the valve-stem of the middle cylinder, it moves the valve in accordance with the movement of the middle cross-head 8 which is connected to the rock-shaft 12. The movement of the shaft 12 by the inner arm opens the valve at the end of the piston stroke, and the movement by the outer arm 23 gives the valve its full travel and maximum port opening.

The two reverse links 10 and 11 are arranged as shown in Figs. 3 and 6, so as to take up as little space as possible.

There are three bearings on a bracket 26. The inner trunnion 11ᵇ of the link 11 extends into a cavity in the trunnion 10ª of the link 10 which forms its bearing. The trunnion 10ª of the link 10 is mounted in the central bearing 27 of the bracket 26.

The other trunnion of the link 10 is mounted in an outer bearing 28, and the outer trunnion of the link 11 is mounted in an outer bearing 29 (see Fig. 6).

The links thus placed in alignment allow the rods 17, 18 and 19 to be raised and lowered by a single reversing shaft 20 extending across the locomotive as shown in Fig. 3.

The shaft has three arms 31 which are connected by links 32 to the ends of their respective rods 17, 18 and 19.

I claim:—

1. The combination in a valve gear for a three-cylinder locomotive, of two side cylinders and a central cylinder; a valve chest for each of said cylinders; valves in the chests; a transverse reversing shaft; three reversing links, two of said links being on one side of the locomotive and one on the opposite side thereof; three levers in substantial alignment, said levers being connected to the valves; rods connecting the levers with their respective links, said rods being connected to the reversing shaft; a single axle; two cranks on one end of said axle connected to the two links on that side of the locomotive; and a single crank on the opposite end of said axle connected to the single link on that side of the locomotive.

2. The combination in a valve motion for a three-cylinder locomotive, of three valves; a transverse reversing shaft extending from one side of the locomotive to the other; two links on one side of the locomotive; a single link on the opposite side thereof, the three links being in alignment; means driven from one of the axles of the locomotive for actuating each of said links; means controlled by the links for independently actuating the valves, said means being connected to the transverse reversing shaft; and connections between said means and the transverse reversing shaft.

3. The combination in a valve mechanism for a locomotive, of a reversing shaft; two reverse links on one side of the locomotive, said links being arranged side-by-side and each link having trunnions at each side, the inner trunnion of one side being of greater diameter than the inner trunnion of the adjoining link, said enlarged trunnion having a cavity therein, the inner trunnion of the other link extending into said cavity in the enlarged trunnion; a fixed bearing on the locomotive extending between the two links and in which the enlarged trunnion is mounted; fixed bearings for the outside trunnions of the two links; means for actuating the links; and rods extending through the links; and means connecting the rods with the reversing shaft.

4. The combination in a valve mechanism for a three-cylinder locomotive, of three valves; a rod attached to each valve; three reversing links, two of said links being arranged close together on one side of the locomotive; a single link on the opposite side thereof, said links being in transverse alignment; an axle having wheels; a double crank on one end of said axle; pins on the double crank, said pins being connected to the two reversing links on that side of the locomotive and the crank at the opposite end of the axle; connections between the said crank and the single link on that side of the locomotive; rods connecting the links with the valve rods of their respective cylinders; a transverse reversing shaft having three arms; connections between the arms and their respective rods; three cross-heads; and levers connecting said rods with their respective cross-heads.

5. The combination in a valve mechanism for a locomotive, of a frame; a fixed bracket thereon; a rocker mounted in the bracket; a transverse shaft carried by the outer end of said rocker, said shaft having two arms; a piston cross-head; connections between the said cross-head and one of said arms of the rock-shaft; reversing mechanism; connections between the other arm and said reversing mechanism; and a valve rod having a head mounted on the rock-shaft.

VICTOR R. STEWART.